United States Patent
Cui et al.

(10) Patent No.: US 10,848,231 B2
(45) Date of Patent: Nov. 24, 2020

(54) USER EQUIPMENT MEASUREMENTS FOR NEW RADIO

(71) Applicant: Apple Inc., Cupertino, CA (US)

(72) Inventors: Jie Cui, Santa Clara, CA (US); Candy Yiu, Portland, OR (US); Rui Huang, Beijing (CN); Yang Tang, San Jose, CA (US); Shuang Tian, Santa Clara, CA (US); Youn Hyoung Heo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/107,475

(22) Filed: Aug. 21, 2018

(65) Prior Publication Data
US 2019/0044602 A1 Feb. 7, 2019

Related U.S. Application Data

(60) Provisional application No. 62/548,270, filed on Aug. 21, 2017, provisional application No. 62/554,380, filed on Sep. 5, 2017.

(51) Int. Cl.
*H04B 7/08* (2006.01)
*H04W 84/04* (2009.01)
*H04B 7/06* (2006.01)

(52) U.S. Cl.
CPC ............ *H04B 7/08* (2013.01); *H04B 7/0626* (2013.01); *H04B 7/086* (2013.01); *H04B 7/0665* (2013.01); *H04W 84/042* (2013.01)

(58) Field of Classification Search
CPC ........ H04B 7/08; H04B 7/086; H04B 7/0626; H04B 7/0417; H04B 7/0669; H04L 1/0618; H04L 1/06; H04L 25/0204
See application file for complete search history.

(56) References Cited

U.S. PATENT DOCUMENTS

| | | | |
|---|---|---|---|
| 2018/0048375 A1* | 2/2018 | Guo | H04B 7/088 |
| 2018/0124687 A1* | 5/2018 | Park | H04L 5/0053 |
| 2018/0206247 A1* | 7/2018 | Sun | H04W 72/085 |
| 2018/0324853 A1* | 11/2018 | Jeon | H04W 52/325 |
| 2018/0359790 A1 | 12/2018 | Ingale et al. | |
| 2019/0052377 A1 | 2/2019 | Hwang et al. | |
| 2019/0081684 A1 | 3/2019 | da Silva et al. | |
| 2019/0372649 A1 | 12/2019 | Cui et al. | |

OTHER PUBLICATIONS

3GPP, "Technical Specification Group Radio Access Network; Evolved Universal Terrestrial Radio Access (E-UTRA); Requirements for support of radio resource management (Release 14)," 3GPP TS 36.133 V14.4.0 (Jun. 2017), Jul. 7, 2017, Lte Advanced Pro, 2582 pages.

* cited by examiner

Primary Examiner — Ted M Wang
(74) Attorney, Agent, or Firm — Sterne, Kessler, Goldstein & Fox P.L.L.C.

(57) ABSTRACT

Methods, systems, and storage media are described for user equipment (UE) measurements for new radio (NR). Other embodiments may be described and/or claimed.

20 Claims, 12 Drawing Sheets

200

```
Receiving or causing to receive from
a user equipment (UE), a radio
resource control (RRC) message
comprising reception beamforming
information associated with a radio
resource management (RRM)
measurement
               205
```

```
Determining, or causing to
determine, based on the reception
beamforming information,
measurement gap information for the
UE for the RRM measurement
               210
```

USER EQUIPMENT MEASUREMENTS FOR NEW RADIO

RELATED APPLICATION

The present application claims priority under 35 U.S.C. § 119 to: U.S. Provisional Application No. 62/548,270 filed Aug. 21, 2017; and U.S. Provisional Application No. 62/554,380 filed Sep. 5, 2017, the contents of which are hereby incorporated by reference in their entirety.

FIELD

Various embodiments of the present application generally relate to the field of wireless communications, and in particular, to user equipment (UE) measurements for new radio (NR).

BACKGROUND

In New Radio (NR) systems, the synchronization sequence blocks (SSBs) or reference signals may be located at the different frequencies from the center frequency of a cell. Additionally, a user equipment (UE) operation bandwidth may be not able to cover the serving cell SS block frequency, or the target cell SS block frequency. Accordingly, UE behaviors and measurement configuration may need modification for proper operation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
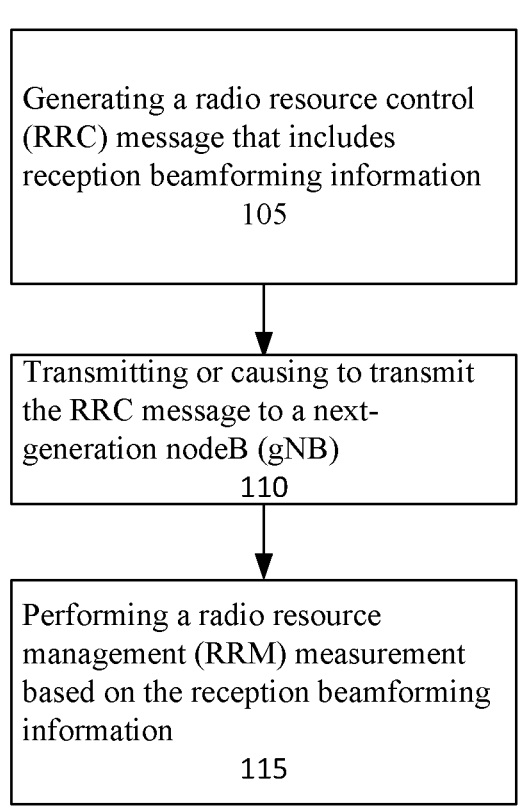
FIGS. 1, 2, 3, and 4 illustrate examples of operation flow/algorithmic structures in accordance with some embodiments.

Embodiments discussed herein may relate to providing measurement information to a network by a UE in conjunction with radio resource management (RRM) measurements for new radio (NR). Embodiments discussed herein may also relate to identifying performance measurement groups, which may have different resources (e.g., gap numbers) for measurement. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Reference-signal-based Radio Resource Management (RRM) Measurements

In some cases, UE behaviors and measurement configuration may need modification for proper operation. For instance, if the UE operation bandwidth is not able to cover the serving cell SS block frequency, the UE may need gap/tuning to perform a serving cell measurement. Intra-frequency and inter-frequency definitions may also need to be specified. In such cases, the frequency layers may need to be clarified or re-grouped in the measurement objects and configurations.

In some embodiments, the definitions of intra-frequency and inter-frequency measurements for New Radio (NR) systems may include the following:

Synchronization signal block (SSB) based Radio Resource Management (RRM) Measurements:
  SSB-based Intra-frequency Measurement: A measurement may be defined as a SSB-based intra-frequency measurement provided the center frequency of the SSB of the serving cell and the center frequency of the SSB of the neighbour cell are the same, and the subcarrier spacing of the two SSBs are also the same.
  SSB-based Inter-frequency Measurement: A measurement may be defined as a SSB-based inter-frequency measurement provided the center frequency of the SSB of the serving cell and the center frequency of the SSB of the neighbour cell are different, or the subcarrier spacing of the two SSBs are different.
  In some embodiments, the above SSB-based measurement definitions may assume that the same cell transmits only one SSB.
Channel State Information (CSI)-Reference Signal (RS) based RRM Measurements:
  CSI-RS based Intra-frequency Measurement: A measurement is defined as a CSI-RS based intra-frequency measurement provided the bandwidth of the CSI-RS resource on the neighbor cell configured for measurement is within the bandwidth of the CSI-RS resource on the serving cell configured for measurement, and the subcarrier spacing of the two CSI-RS resources are the same.
  CSI-RS based Inter-frequency Measurement: A measurement is defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources are different.

Three categories of measurement may include the following: Intra-frequency measurement without radiofrequency (RF) retuning; Intra-frequency measurement with RF retuning; and Inter-frequency measurement with RF retuning. Considering different reference signals, then the categories can be extended to: XRS based Intra-frequency measurement without RF retuning; XRS based Intra-frequency measurement with RF retuning; and XRS based Inter-frequency measurement with RF retuning. In this context, The term "XRS" herein may refer to "X reference signal," where the reference signal may include SSB, CSI-RS, or some other reference signal.

In addition to the categories above, in mmWave the user equipment (UE) reception (Rx) beamforming switching may also cause interruption to the measurement. For instance, if a UE implements one or more specific Rx beams for serving cell and for target cell reference signal measurement, a UE has to use different Rx beams, and therefore, the Rx beam switching may cause interruption or may need gap during the measurement. In some cases, the reception beam switching may be included in the categories above (e.g., an indication of whether the UE requires a measurement gap due to use of reception beam switching). In some embodiments, the network (e.g., a base station, one or more core network elements, etc.) may be informed (e.g., by a message transmitted by the UE) as to which category the UE belongs, particularly in cases where the network is not aware of the Rx beamforming information at the UE.

In various embodiments, if a UE is using Rx beamforming for XRS measurements that may possibly cause Rx beam switching, then such measurements may be categorized as an XRS-based inter-frequency measurement, an XRS-based inter-frequency measurement with RF retuning, or an XRS-based intra-frequency measurement with RF retuning.

In various embodiments, a UE may indicate the measurement category information to network by signaling (e.g., via radio resource control (RRC) signaling/message(s), etc.), and the measurement category may include, for example, the following categories: (1) XRS based Intra-frequency measurement without RF retuning; (2) XRS based Intra-frequency measurement with RF retuning; and/or (3) XRS based Inter-frequency measurement with RF retuning.

In various embodiments, the UE may indicate the RF retuning information to the network by signaling (e.g., via RRC signaling/message(s), etc.), and the RF tuning category may include, for example, the following categories: (1) RF retuning is needed, or (2) RF retuning is not needed.

In various embodiments, the UE may indicate the necessity of measurement gap for measurement to network by signaling (e.g., via RRC signaling/message(s), etc.), and the necessity of measurement gap category here may include, for example, the following categories: (1) measurement gap is needed, or (2) measurement gap is not needed.

In various embodiments, the UE may indicate the Rx beamforming information for measurement to the network by signaling (e.g., via RRC signaling/message(s), etc.), and the Rx beamforming information here may include, for example, the following categories: (1) whether Rx beamforming is used; (2) whether Rx beam switching is used; (3) number of Rx beamforming patterns; (4) number of Rx antenna panels for Rx beamforming; and/or (5) number of measurement cycles for iterating/utilizing all the possible Rx beam patterns.

In the aforementioned embodiments, the various parameters, etc., indicated to the network via signaling may be indicated in one or multiple higher layer messages, and the parameters may be indicated in new or existing fields and/or information elements (IEs) in such messages. The following section provides six enumerated examples of embodiments according to various aspects of the disclosure.

Embodiment 1

If a UE is using Rx beamforming for an XRS measurement that may cause Rx beam switching, then this measurement is categorized into XRS based inter-frequency measurement or XRS based inter-frequency measurement with RF retuning. For instance, the new definition may be revised as shown below for an mmWave example.

SS block (SSB) based RRM Measurements:
  SSB based Intra-frequency Measurement: A measurement is defined as a SSB based intra-frequency measurement provided: the center frequency of the SSB of the serving cell and the center frequency of the SSB of the neighbor cell are the same; the subcarrier spacing of the two SSBs are the same; and the Rx beamforming pattern of the two SSBs are the same.
  SSB based Inter-frequency Measurement: A measurement is defined as a SSB based inter-frequency measurement provided: the center frequency of the SSB of the serving cell and the center frequency of the SSB of the neighbor cell are different; the subcarrier spacing of the two SSBs are different; or the Rx beamforming pattern of the two SSBs are different.

CSI-RS based RRM Measurements:
  CSI-RS based Intra-frequency Measurement: A measurement is defined as a CSI-RS based intra-frequency measurement provided: the bandwidth of the CSI-RS resource on the neighbor cell configured for measurement is within the bandwidth of the CSI-RS resource on the serving cell configured for measurement; the subcarrier spacing of the two CSI-RS resources are the same; and the Rx beamforming pattern of the two CSI-RS resources are the same.
  CSI-RS based Inter-frequency Measurement: A measurement is defined as a CSI-RS based inter-frequency measurement provided: the bandwidth of the CSI-RS resource on the neighbor cell configured for measurement is not within the bandwidth of the CSI-RS resource on the serving cell configured for measurement; the subcarrier spacing of the two CSI-RS resources are different; or the Rx beamforming pattern for the two CSI-RS resources are different.

Embodiment 2

If a UE is using Rx beamforming for an XRS measurement which may involve Rx beam switching, then this measurement is categorized into XRS based intra-frequency measurement with RF retuning. If the Rx beam switching is needed at the UE side for an XRS measurement, then it may need a measurement gap for the measurement. However in this case the XRS from the serving cell and from target cell have the same center frequency, and therefore, this case is categorized into XRS based intra-frequency measurement with RF retuning.

Embodiment 3

A UE may indicate the measurement category information to network by signaling (e.g., via RRC), and the measurement category here may include the following categories: XRS based Intra-frequency measurement without RF retuning; XRS based Intra-frequency measurement with RF retuning; or XRS based Inter-frequency measurement with RF retuning.

The Rx beamforming is a UE implementation behavior, and so the network may not be aware if the UE is using Rx beamforming or not. In such cases, the UE may need to indicate to the network the UE's measurement category to let network know what the UE's behavior will be, allowing the network to decide if a measurement gap is needed for the UE.

Embodiment 4

A UE may indicate the RF retuning information to network by signaling (e.g., via RRC), and the RF tuning category may include: RF retuning is needed, or RF retuning is not needed.

The Rx beamforming is a UE implementation behavior, and so the network may not be aware if the UE is using Rx beamforming or not. In such cases, the UE may need to indicate to the network the UE's measurement category to let network know what the UE's behavior will be, allowing the network to decide if a measurement gap is needed for the UE, particularly since the RF retuning may be related to the measurement gap.

Embodiment 5

A UE may indicate the necessity of a measurement gap to perform a measurement to a network by signaling (e.g., via RRC). The necessity of a measurement gap category may include: a measurement gap is needed, or measurement gap is not needed.

The Rx beamforming is a UE implementation behavior, and so the network may not be aware if the UE is using Rx beamforming or not. In such cases, the UE may need to indicate to the network the UE's measurement category to let network know what the UE's behavior will be, allowing the network to decide if a measurement gap is needed for the UE.

Embodiment 6

UE may indicate the Rx beamforming information for measurement to network by signaling (e.g., via RRC), and the Rx beamforming information here may include: whether Rx beamforming is used, whether Rx beam switching is used, a number of Rx beamforming patterns, a number of Rx antenna panels for Rx beamforming, and/or a number of measurement cycles for iterating/utilizing all the possible Rx beam patterns.

The Rx beamforming is a UE implementation behavior, and so the network may not be aware if the UE is using Rx beamforming or not. In such cases, the UE may need to indicate to the network the UE's measurement category to let network know what the UE's behavior will be, allowing the network to decide if a measurement gap is needed for the UE.

In some embodiments, the number of cycles for iterating/utilizing all the possible Rx beam patterns indicates that if UE can use only one Rx beam pattern at one time, then the UE may need n measurement occasions to try all the n Rx beam patterns. The total measurement time/delay may be expressed as: $n*single\_measurement\_occasion\_delay$ (where n is a natural number).

Figure 2:

In some embodiments, the electronic device(s), network(s), system(s), chip(s) or component(s), or portions or implementations thereof, of FIGS. 5-12 herein may be configured to perform or execute one or more operation flow/algorithmic structures, processes, techniques, or methods as described herein, or portions thereof, including the operation flow/algorithmic structures illustrated in FIGS. 1 and 2.

One example of an operation flow/algorithmic structure is depicted in FIG. 1, which may be performed by a UE in accordance with some embodiments. In this example, operation flow/algorithmic structure 100 may include, at 105, generating a radio resource control (RRC) message that includes reception beamforming information. In some embodiments, the reception beamforming information may include a number of reception beamforming patterns for performing a radio resource management (RRM) measurement.

In some embodiments, the reception beamforming information further includes an indicator of whether reception beamforming is used by the UE, an indicator of whether reception beam switching is used by the UE, a number of reception antenna panels for reception beamforming, or a number of cycles for reception beam pattern iteration.

Operation flow/algorithmic structure 400 may further include, at 410, transmitting or causing to transmit the RRC message to a next-generation nodeB (gNB). In some embodiments, the RRC message further includes measurement gap information, the measurement gap information including an indicator that a measurement gap is needed or an indicator that a measurement gap is not needed.

Operation flow/algorithmic structure 400 may further include, at 415, performing a radio resource management (RRM) measurement based on the reception beamforming information. In some embodiments, the RRM measurement is based on a reference signal. In some embodiments, the reference signal may be a synchronization signal block (SSB) or a channel state information reference signal (CSI-RS). In some embodiments, the RRM measurement is an intra-frequency measurement without radio frequency (RF) retuning, an intra-frequency measurement with RF retuning, or an inter-frequency measurement with RF retuning.

Another example of an operation flow/algorithmic structure is depicted in FIG. 2, which may be performed by a gNB in accordance with some embodiments. In this example, operation flow/algorithmic structure 200 may include, at 205, receiving or causing to receive from a user equipment (UE), a radio resource control (RRC) message comprising reception beamforming information associated with a radio resource management (RRM) measurement.

Operation flow/algorithmic structure 200 may further include, at 210, Determining, or causing to determine, based on the reception beamforming information, measurement gap information for the UE for the RRM measurement.

Frequency Group Priorities for New Radio (NR)

In New Radio (NR) systems, the SS (synchronization sequence) blocks or reference signals may be located at a different frequency from the center frequency of a cell. Additionally, the user equipment (UE) operation bandwidth may be not able to cover the serving cell SS block frequency or the target cell SS block frequency. Accordingly, the behavior of the UE and measurement configuration may need to be adjusted for proper operation.

For instance, if the UE operation bandwidth is not able to cover the serving cell SS block frequency, the UE may need gap/tuning to perform a serving cell measurement. In some cases, intra-frequency and inter-frequency definitions may be not easy to be specified, therefore the frequency layers may need to be further clarified or re-grouped in the measurement objects and configurations.

Typically, Long Term Evolution (LTE) systems include normal performance and reduced performance measurement groups, which may have different resource(s) (e.g., gap number) for measurement. NR systems may need to add more clarifications to accommodate new UE behaviors.

In one embodiment according to the present disclosure, the measurement configurations or objects may include three performance groups: a high performance group, a normal performance group, and a reduced performance group. In this example, the high performance group may be for serving cell related measurements and have the most measurement resource (e.g., gap numbers) of the three groups. The normal performance group has fewer measurement resources than the high performance group but more measurement resources than reduced performance group, while the reduced performance group has the least measurement resources of the three groups. The groups may be interpreted as either groups of frequency layers or groups of cells.

In another embodiment, the measurement configurations or objects may include three groups: a serving cell group, a normal performance group, and a reduced performance group. In this example, the serving cell measurements group has the most measurement resources (e.g., gap numbers), while the normal performance group has fewer measurement resources than the serving cell measurement group but more measurement resources than the reduced performance group. The reduced performance group has the lease measurement resources. These groups may be interpreted as either groups of frequency layers or groups of cells.

The measurement performance for different carriers may be configured by higher layers to be high, normal, or reduced performance. A measurement scaling factor, defining the relaxation to be applied to the requirements for carriers measured with reduced measurement performance, may be signaled by higher layers. The scaling factor (Kh, Kn, Kr) may be used to derive different measurement periods. For example, Kh is the scaling factor for the high performance group and may be set as the smallest value among Kh, Kn, Kr, indicating the high performance group requires the UE to complete the measurement within the shortest period of time relative to the normal performance group or the reduced performance group. In some embodiments, Kn and Kr may be defined as described in the 3rd Generation Partnership Project (3GPP) Technical Specification (TS) 36.133.

Different performance groups may have different proportions of gap resources. For example, the high performance group may have the largest proportion of gap resources from the serving cell, while the normal performance group may have a smaller proportion of gap resource than high performance group, but a larger proportion of gap resources than reduced performance group. The reduced performance group may have the smallest proportion of gap resources from serving cell of the three groups.

In some embodiments, the high performance group may indicate the highest/first priority of measurements, which require the UE to complete the measurement as soon as possible. The normal performance group may indicate an intermediate/second priority of measurements, which require UE to complete the measurement after the high performance group. The reduced performance group may indicate a lowest/third priority of measurements.

Figure 3:
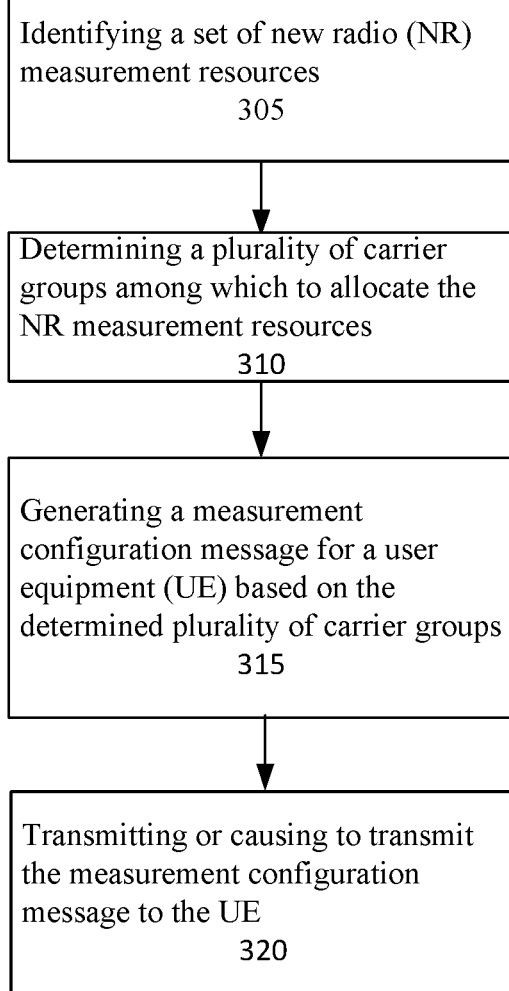
Figure 4:
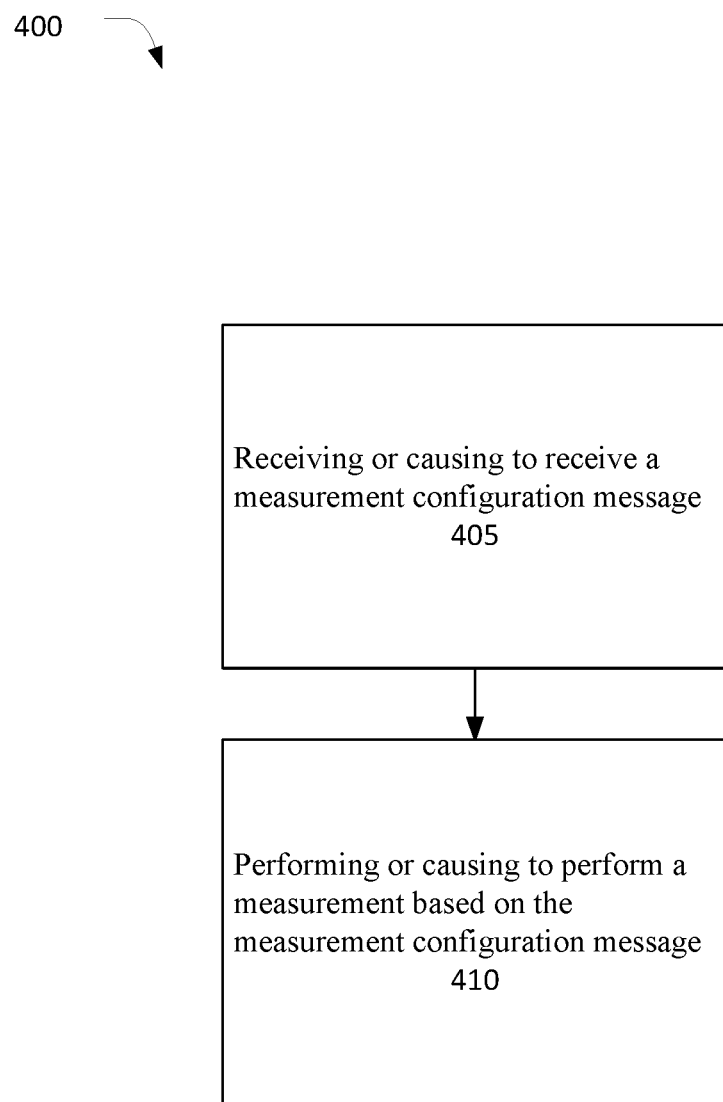

In some embodiments, the electronic device(s), network(s), system(s), chip(s) or component(s), or portions or implementations thereof, of FIGS. 5-12 herein may be configured to perform or execute one or more operation flow/algorithmic structures, processes, techniques, or methods as described herein, or portions thereof, including the operation flow/algorithmic structures illustrated in FIGS. 3 and 4.

One example of an operation flow/algorithmic structure is depicted in FIG. 3, which may be performed by a UE in accordance with some embodiments. In this example, operation flow/algorithmic structure 300 may include, at 305, identifying a set of new radio (NR) measurement resources. In some embodiments, the set of NR measurement resources includes one or more measurement gaps.

Operation flow/algorithmic structure 300 may further include, at 310, determining a plurality of carrier groups among which to allocate the NR measurement resources. In some embodiments the plurality of carrier groups includes a high-performance group containing a first portion of the NR measurement resources; a normal performance group containing a second portion of the NR measurement resources; and a reduced performance group containing a third portion of the NR measurement resources, wherein the normal performance group contains fewer measurement resources than the high-performance group, and the reduced performance group contains fewer NR measurement resources than the normal performance group.

In some embodiments, the high-performance group is for serving cell-related measurements by the UE. In some embodiments, the plurality of carrier groups are associated with a group of frequency layers or a group of cells. In some embodiments, determining the plurality of carrier groups includes determining, for each respective carrier group, a respective measurement scaling factor associated with a respective time period to complete a measurement. In some embodiments, the time period to complete a measurement for the normal performance group is longer than the time period to complete a measurement for the high-performance group, and wherein the time period to complete a measurement for the reduced performance group is longer than the time period to complete a measurement for the normal performance group Operation flow/algorithmic structure 300 may further include, at 315, generating a measurement configuration message for a user equipment (UE) based on the determined plurality of carrier groups.

Operation flow/algorithmic structure 300 may further include, at 320, transmitting or causing to transmit the measurement configuration message to the UE.

Another example of an operation flow/algorithmic structure is depicted in FIG. 4, which may be performed by a gNB in accordance with some embodiments. In this example, operation flow/algorithmic structure 400 may include, at 405, receiving or causing to receive a measurement configuration message. In some embodiments, the measurement configuration message includes information regarding respective measurement scaling factor associated with a respective time period to complete a measurement.

Operation flow/algorithmic structure 400 may further include, at 410, performing or causing to perform a measurement based on the measurement configuration message.

Figure 5:
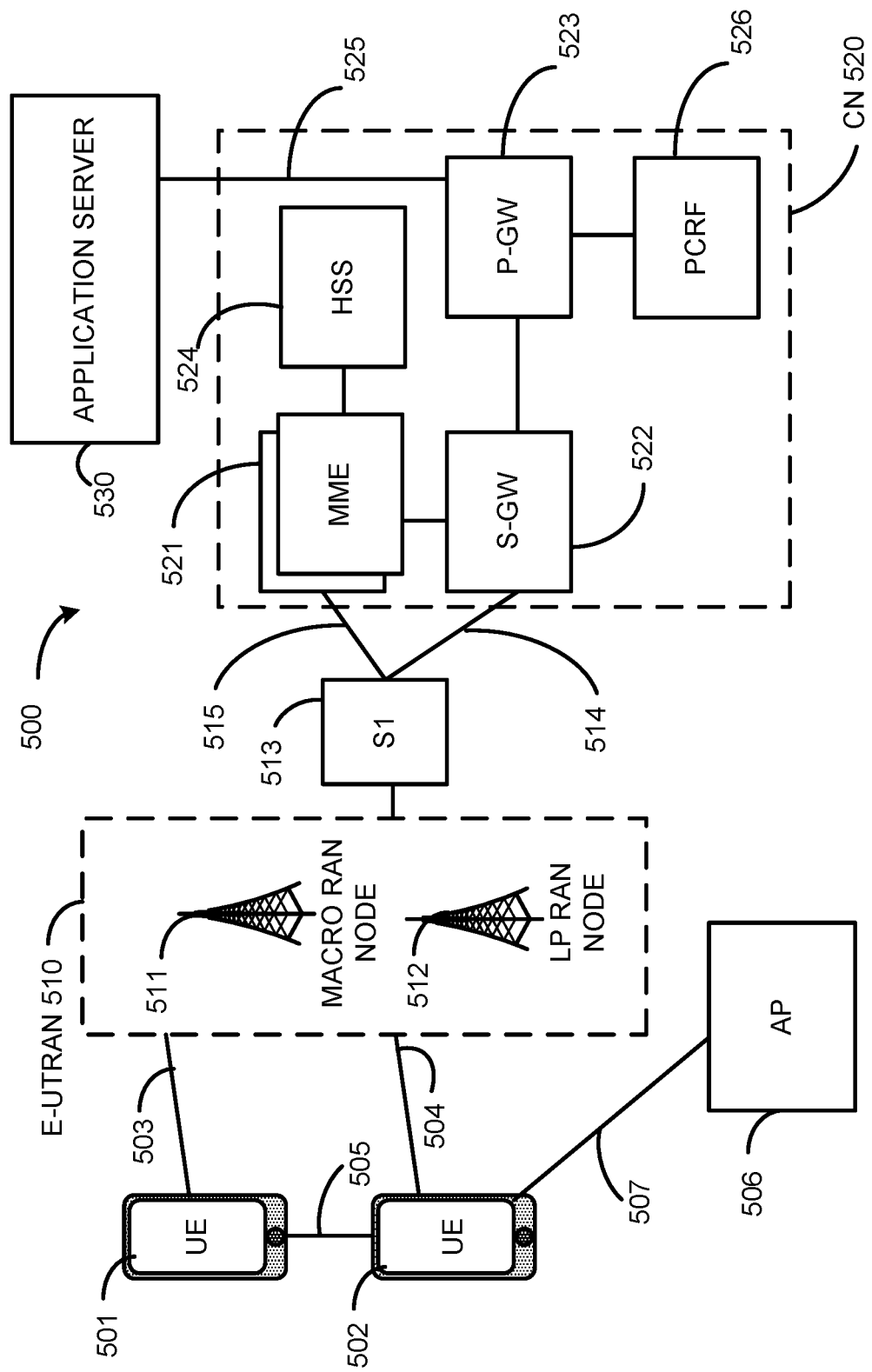
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MIME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
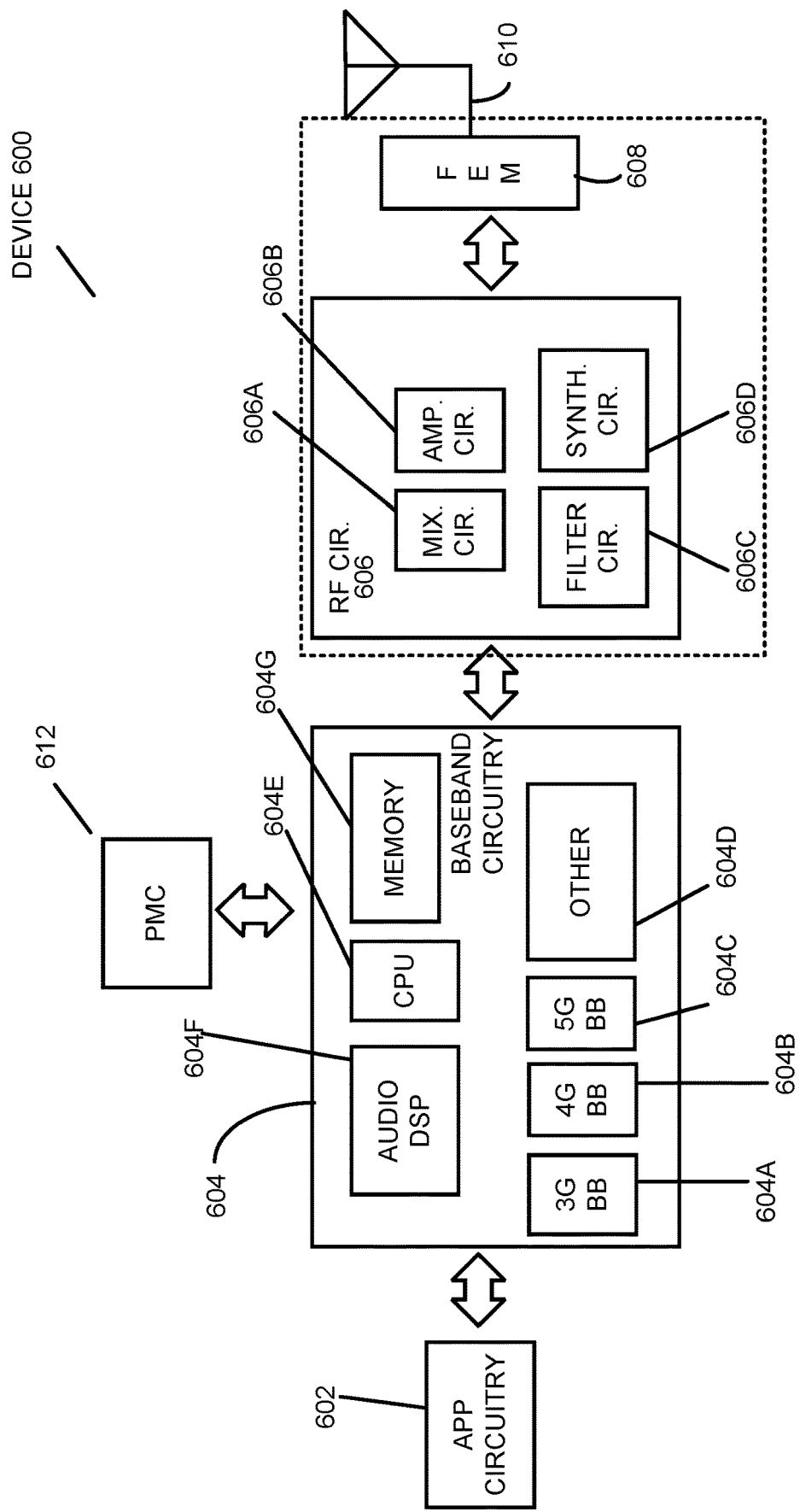
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
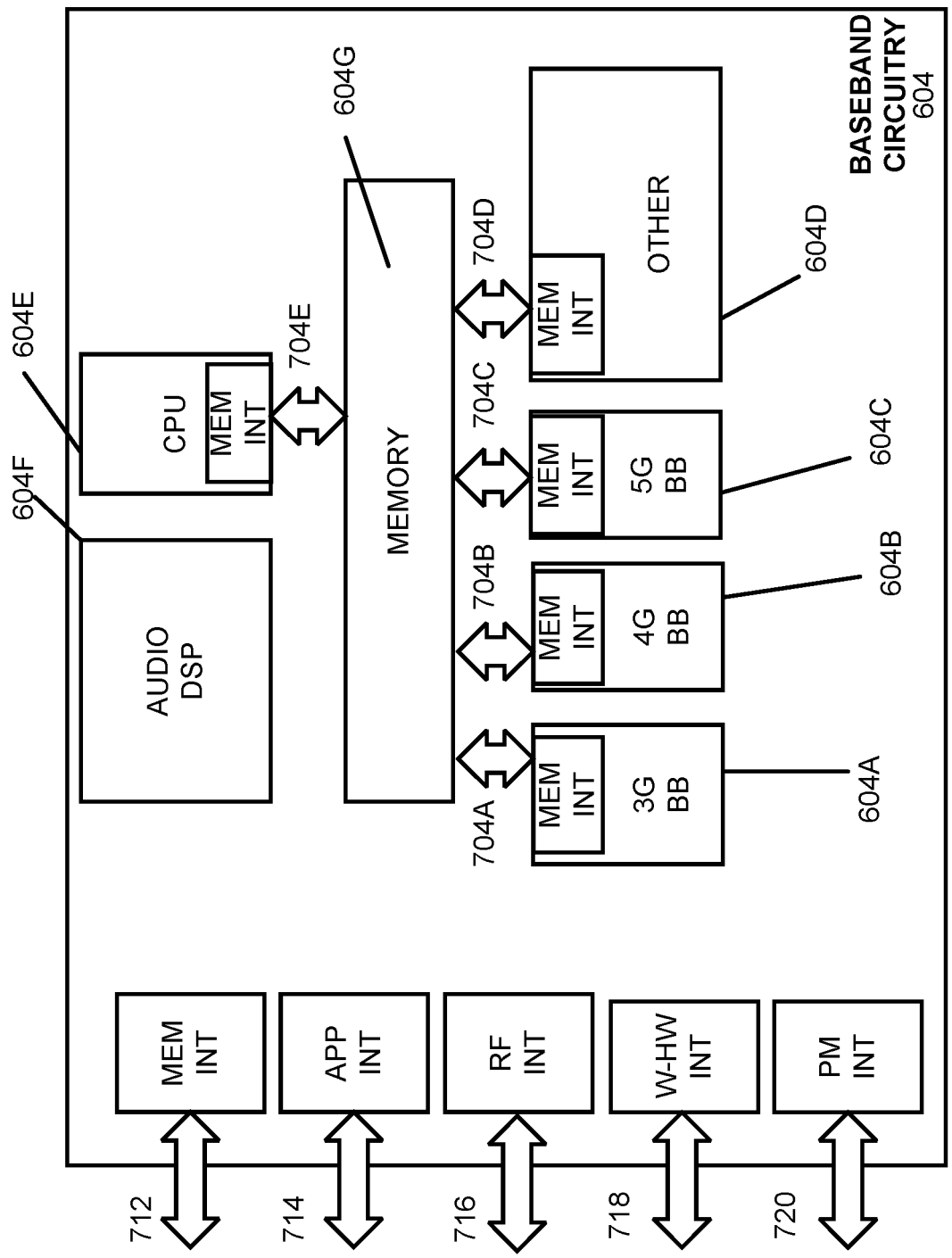
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
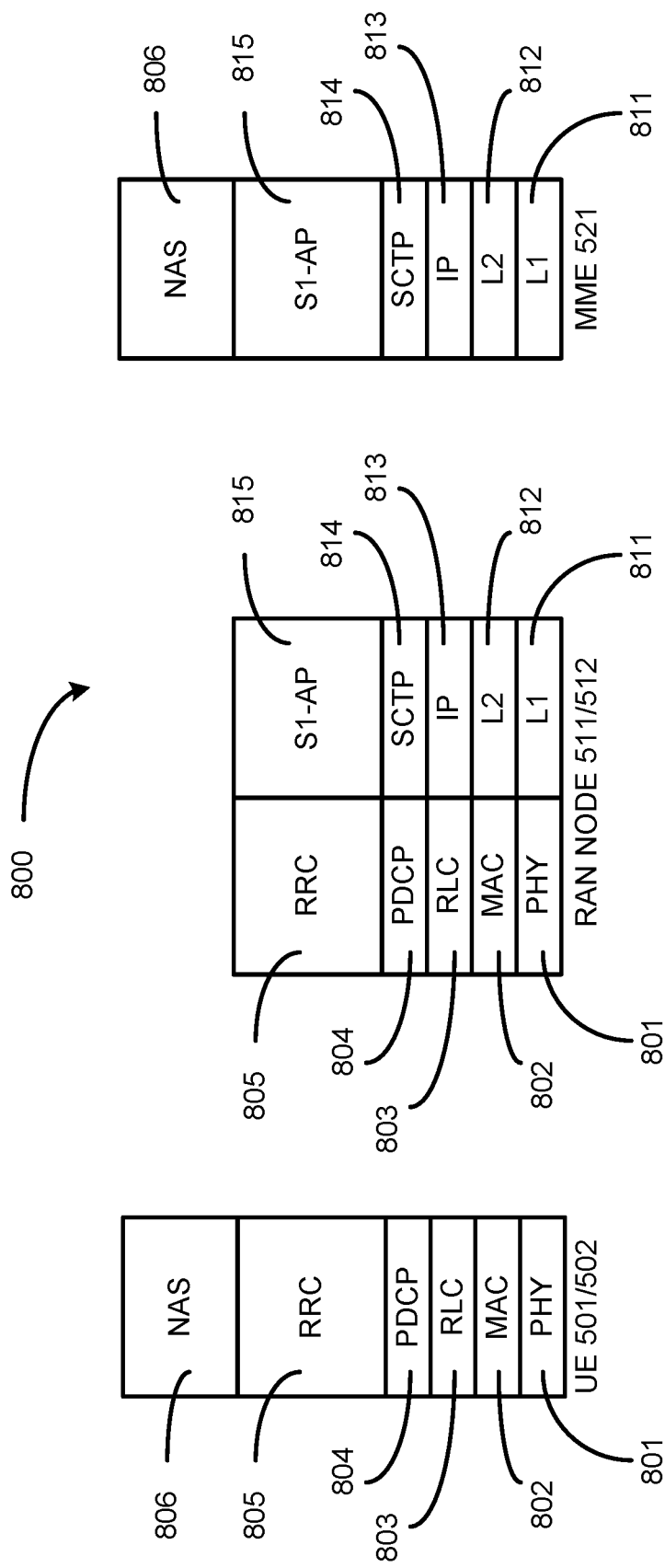
FIG. 8 is an illustration of a control plane protocol stack in accordance with some embodiments.

FIG. 8 is an illustration of a control plane protocol stack in accordance with some embodiments. In this embodiment, a control plane 800 is shown as a communications protocol stack between the UE 501 (or alternatively, the UE 502), the RAN node 511 (or alternatively, the RAN node 512), and the MME 521.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 501 and the MME 521. The NAS protocols 806 support the mobility of the UE 501 and the session management procedures to establish and maintain IP connectivity between the UE 501 and the P-GW 523.

The S1 Application Protocol (S1-AP) layer 815 may support the functions of the S1 interface and comprise Elementary Procedures (EPs). An EP is a unit of interaction between the RAN node 511 and the CN 520. The S1-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 511 and the MME 521 based, in part, on the IP protocol, supported by the IP layer 813. The L2 layer 812 and the L1 layer 811 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 811, the L2 layer 812, the IP layer 813, the SCTP layer 814, and the S1-AP layer 815.

Figure 9:
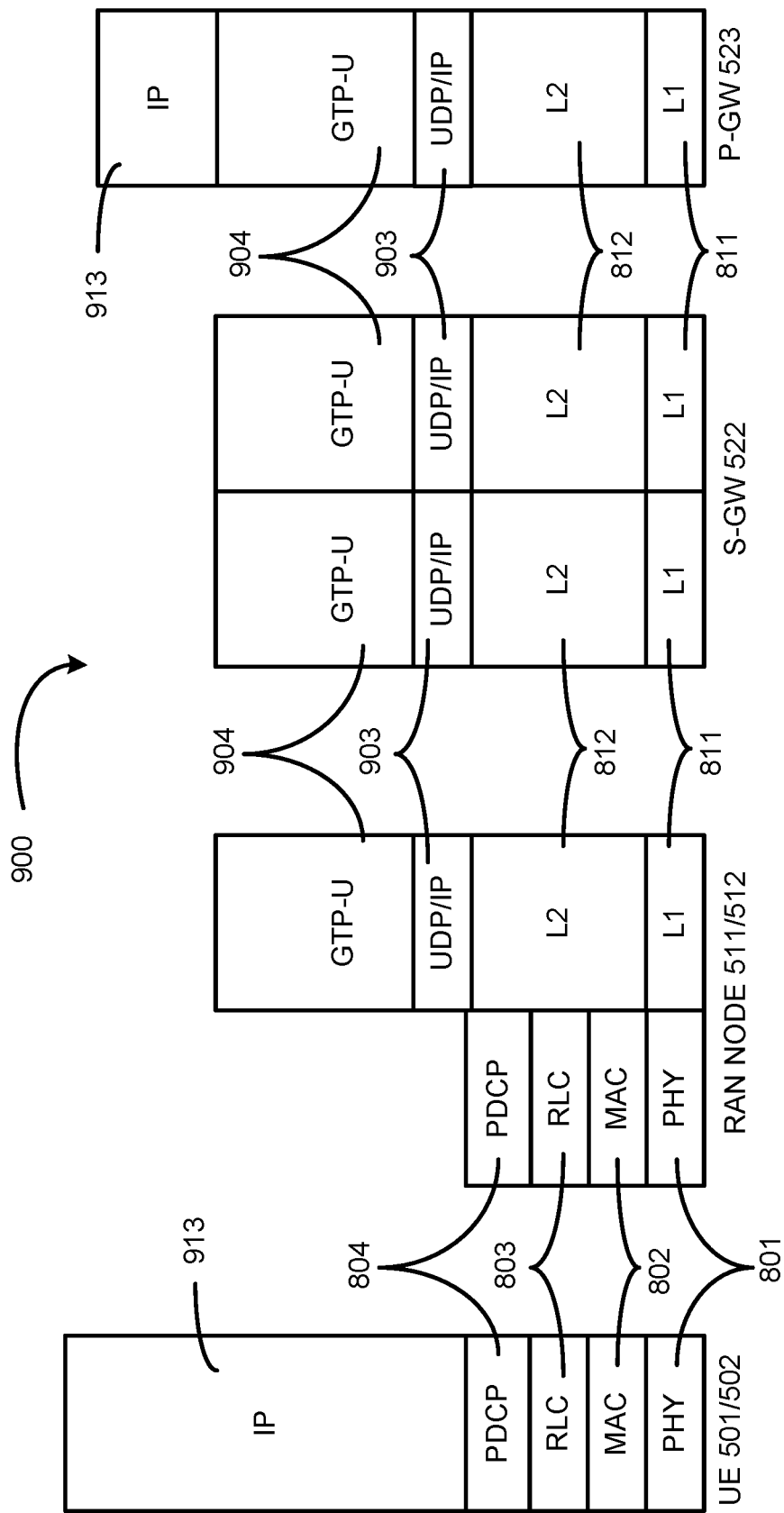
FIG. 9 is an illustration of a user plane protocol stack in accordance with some embodiments.

FIG. 9 is an illustration of a user plane protocol stack in accordance with some embodiments. In this embodiment, a user plane 900 is shown as a communications protocol stack between the UE 501 (or alternatively, the UE 502), the RAN node 511 (or alternatively, the RAN node 512), the S-GW 522, and the P-GW 523. The user plane 900 may utilize at least some of the same protocol layers as the control plane 800. For example, the UE 501 and the RAN node 511 may utilize a Uu interface (e.g., an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 913 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 811, the L2 layer 812, the UDP/IP layer 913, and the GTP-U layer 904. The S-GW 522 and the P-GW 523 may utilize an S5/S8a interface to exchange user plane data via a protocol stack comprising the L1 layer 811, the L2 layer 812, the UDP/IP layer 913, and the GTP-U layer 904. As discussed above with respect to FIG. 8, NAS protocols support the mobility of the UE 501 and the session management procedures to establish and maintain IP connectivity between the UE 501 and the P-GW 523.

Figure 10:
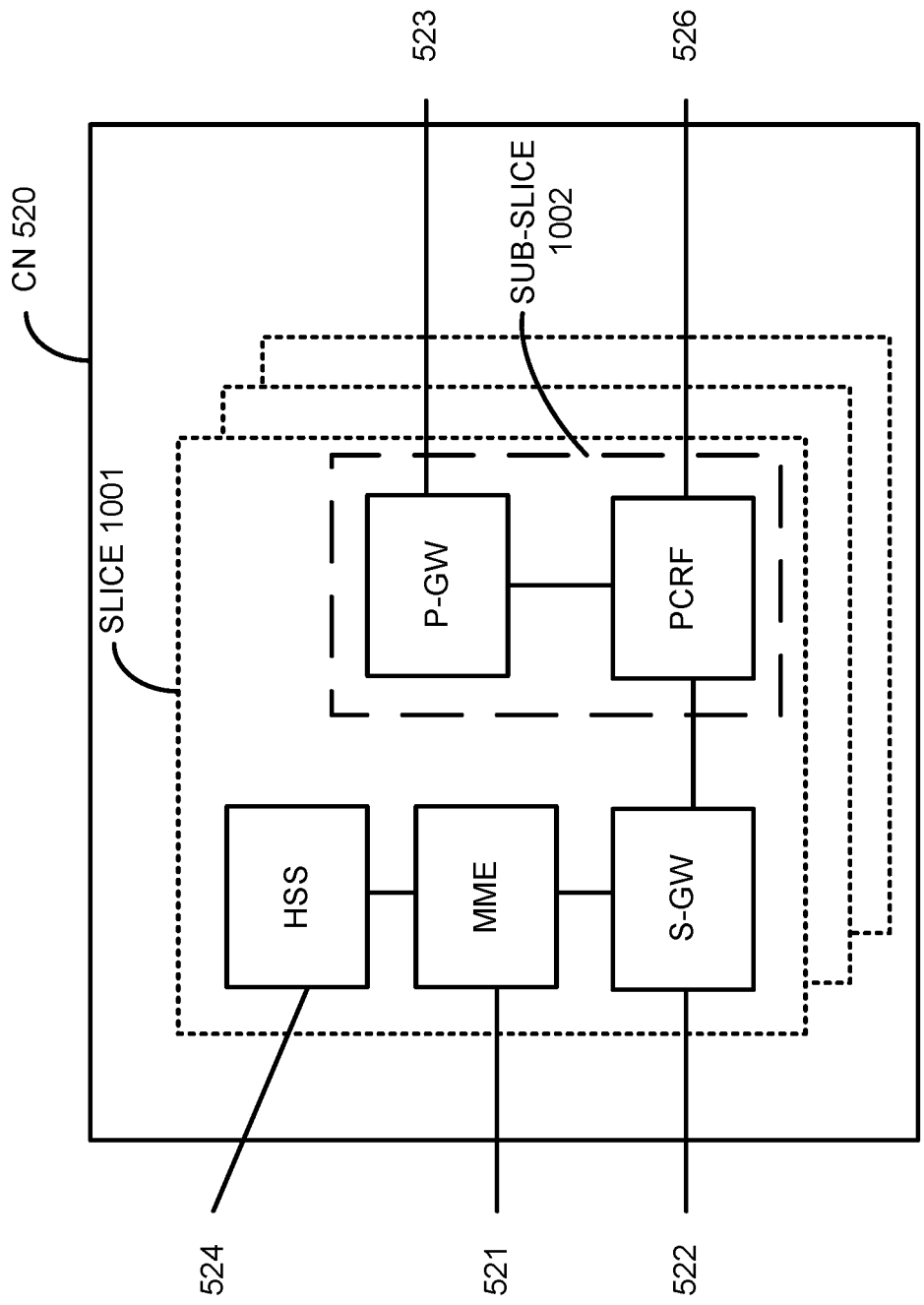
FIG. 10 illustrates components of a core network in accordance with some embodiments.

FIG. 10 illustrates components of a core network in accordance with some embodiments. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 520 may be referred to as a network slice 1001. A logical instantiation of a portion of the CN 520 may be referred to as a network sub-slice 1002 (e.g., the network sub-slice 1002 is shown to include the PGW 523 and the PCRF 526).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
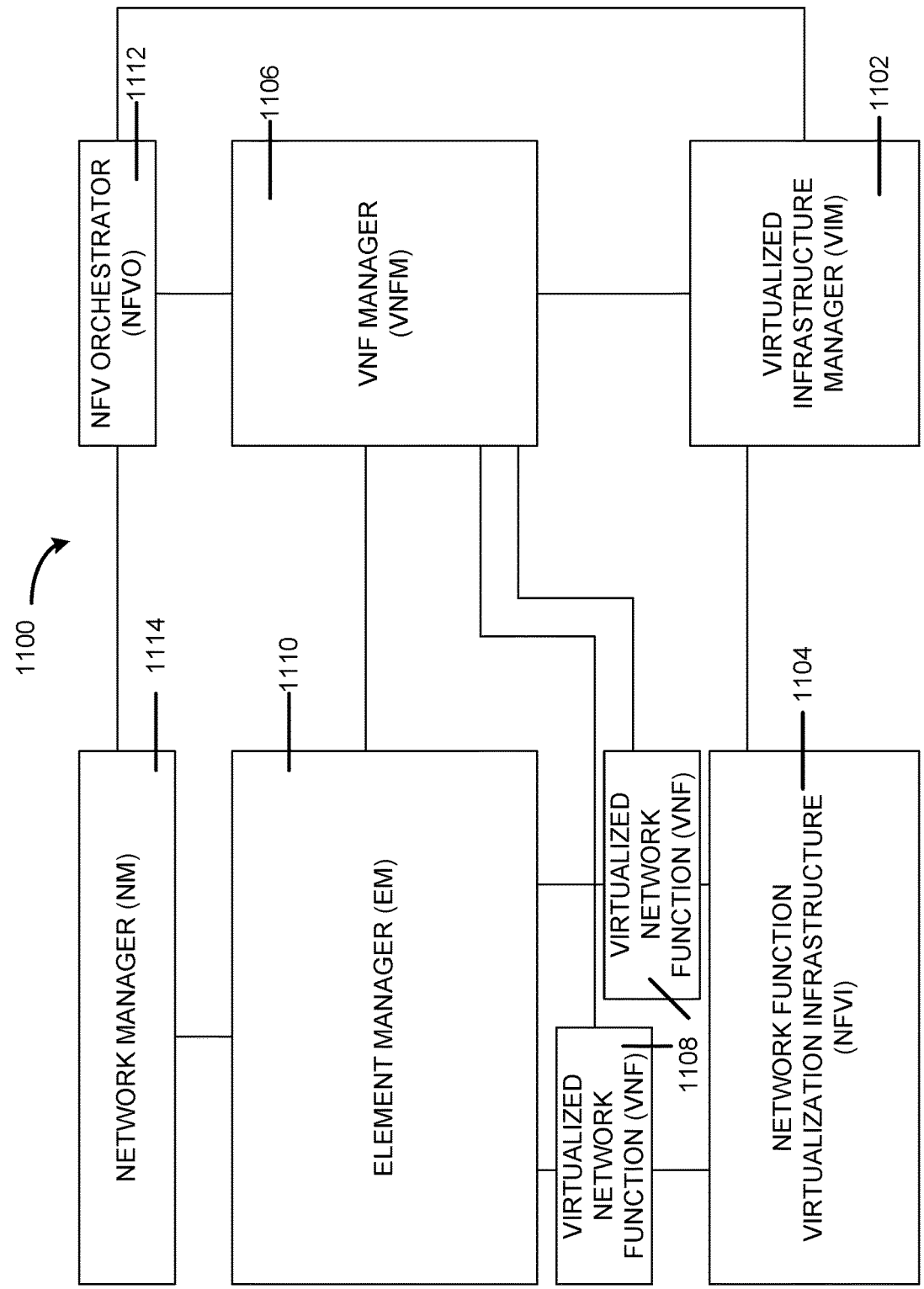
FIG. 11 is a block diagram illustrating components, according to some embodiments, of a system to support network function virtualization (NFV).

FIG. 11 is a block diagram illustrating components, according to some example embodiments, of a system 1100 to support NFV. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
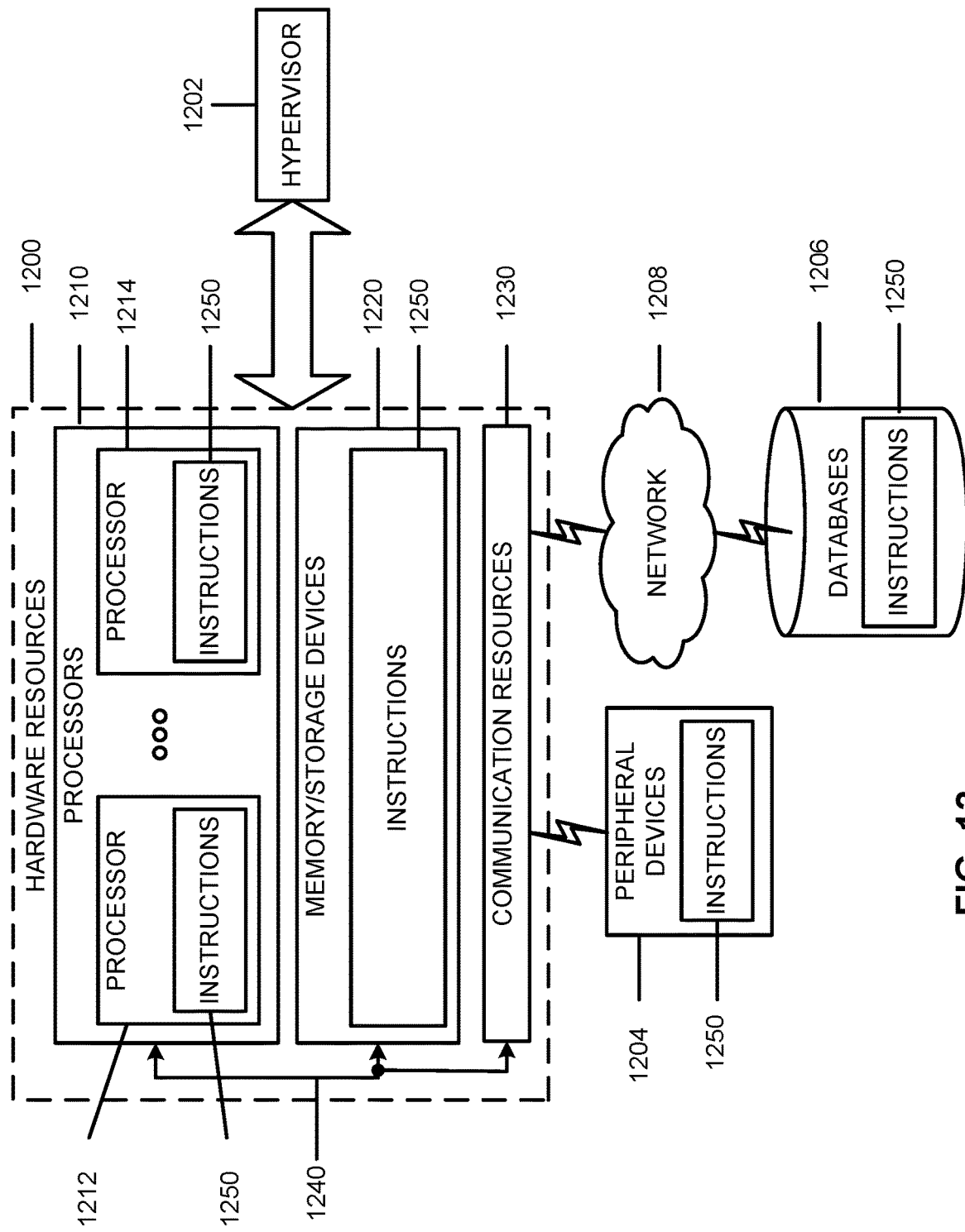
FIG. 12 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In various embodiments, the devices/components of FIGS. 5, 6, 8, 9, 10, 11, 12, and particularly the baseband circuitry of FIG. 7, may be used for: generating a radio resource control (RRC) message that includes reception beamforming information; transmitting or causing to transmit the RRC message to a next-generation nodeB (gNB); and performing a radio resource management (RRM) measurement based on the reception beamforming information. The devices/components of FIGS. 5-12 may also be used to practice, in whole or in part, any of the operation flow/algorithmic structures depicted in FIGS. 1-4.

EXAMPLES

Some non-limiting examples are provided below.

Example 1 includes one or more computer-readable media storing instructions, that, when executed by one or more processors, cause a user equipment (UE) to: generate a radio resource control (RRC) message that includes reception beamforming information, the reception beamforming information including a number of reception beamforming patterns for performing a radio resource management (RRM) measurement; and transmit or cause to transmit the RRC message to a next-generation nodeB (gNB).

Example 2 includes the one or more computer-readable media of example 1 or some other example herein, wherein the reception beamforming information further includes an indicator of whether reception beamforming is used by the UE, an indicator of whether reception beam switching is used by the UE, a number of reception antenna panels for reception beamforming, or a number of cycles for reception beam pattern iteration.

Example 3 includes the one or more computer-readable media of example 1 or some other example herein, wherein the one or more computer-readable media further stores instructions for causing the UE to: perform a radio resource management (RRM) measurement based on the reception beamforming information.

Example 4 includes the one or more computer-readable media of example 3 or some other example herein, wherein the RRM measurement is based on a reference signal, and wherein the reference signal is a synchronization signal block (SSB) or a channel state information reference signal (CSI-RS).

Example 5 includes the one or more computer-readable media of example 4 or some other example herein, wherein the RRM measurement is an intra-frequency measurement without radio frequency (RF) retuning, an intra-frequency measurement with RF retuning, or an inter-frequency measurement with RF retuning.

Example 6 includes the one or more computer-readable media of example 1 or some other example herein, wherein the RRC message further includes RF retuning information, the RF retuning information including an indicator that RF retuning is needed or an indicator that RF retuning is not needed.

Example 7 includes the one or more computer-readable media of example 1 or some other example herein, wherein the RRC message further includes measurement gap information, the measurement gap information including an indicator that a measurement gap is needed or an indicator that a measurement gap is not needed.

Example 8 includes one or more computer-readable media storing instructions, that, when executed by one or more processors, cause a next-generation nodeB (gNB) to: receive or cause to receive from a user equipment (UE), a radio resource control (RRC) message comprising reception beamforming information associated with a radio resource management (RRM) measurement, the reception beamforming information including a number of reception beamforming patterns for performing a radio resource management (RRM) measurement; and determine, or cause to determine, based on the reception beamforming information, measurement gap information for the UE for the RRM measurement.

Example 9 includes the one or more computer-readable media of example 8 or some other example herein, wherein the reception beamforming information further includes an indicator of whether reception beamforming is used by the UE, an indicator of whether reception beam switching is used by the UE, a number of reception antenna panels for reception beamforming, or a number of cycles for reception beam pattern iteration.

Example 10 includes the one or more computer-readable media of example 8 or some other example herein, wherein the RRC message further includes RF retuning information, the RF retuning information including an indicator that RF retuning is needed or an indicator that RF retuning is not needed.

Example 11 includes the one or more computer-readable media of example 8 or some other example herein, wherein the RRC message further includes measurement gap information, the measurement gap information including an indicator that a measurement gap is needed or an indicator that a measurement gap is not needed.

Example 12 includes an apparatus comprising: memory to store reception beamforming information, the reception beamforming information including a number of reception beamforming patterns; and processing circuitry, coupled with the memory, to: generate a radio resource control (RRC) message including at least a portion of the reception beamforming information; and cause the RRC message to be transmitted to a next-generation NodeB (gNB) to determine measurement gap information based on the reception beamforming information.

Example 13 includes the apparatus of example 12 or some other example herein, wherein the reception beamforming information further includes an indicator of whether reception beamforming is used, an indicator of whether reception beam switching is used, a number of reception antenna panels for reception beamforming, or a number of cycles for iterating reception beam pattern.

Example 14 includes the apparatus of example 12 or some other example herein, wherein the processing circuitry is further to: perform a radio resource management (RRM) measurement based on the reception beamforming information.

Example 15 includes the apparatus of example 14 or some other example herein, wherein the RRM measurement is based on a reference signal, and wherein the reference signal is a synchronization signal block (SSB) or a channel state information reference signal (CSI-RS).

Example 16 includes the apparatus of example 15 or some other example herein, wherein the RRM measurement is an intra-frequency measurement without radio frequency (RF) retuning, an intra-frequency measurement with RF retuning, or an inter-frequency measurement with RF retuning.

Example 17 includes the apparatus of example 12 or some other example herein, wherein the RRC message further includes RF retuning information, the RF retuning information including an indicator that RF retuning is needed or an indicator that RF retuning is not needed.

Example 18 includes the apparatus of example 12 or some other example herein, wherein the RRC message further includes measurement gap information, the measurement gap information including an indicator that a measurement gap is needed or an indicator that a measurement gap is not needed.

Example 19 includes one or more computer-readable media storing instructions, that, when executed by one or more processors, cause a next-generation Node-B (gNB) to: identify a set of new radio (NR) measurement resources; determine a plurality of carrier groups among which to allocate the NR measurement resources, wherein the plurality of carrier groups includes: a high-performance group containing a first portion of the NR measurement resources; a normal performance group containing a second portion of the NR measurement resources; and a reduced performance group containing a third portion of the NR measurement resources, wherein the normal performance group contains fewer measurement resources than the high-performance group, and the reduced performance group contains fewer NR measurement resources than the normal performance group; and generate a measurement configuration message for a user equipment (UE) based on the determined plurality of carrier groups.

Example 20 includes the one or more computer-readable media of example 19 or some other example herein, wherein the one or more computer-readable media further stores instructions for causing the gNB to generate a measurement configuration message for a user equipment (UE) based on the determined plurality of carrier groups.

Example 21 includes the one or more computer-readable media of example 19 or some other example herein, wherein the one or more computer-readable media further stores instructions for causing the gNB to transmit or cause to transmit the measurement configuration message to the UE.

Example 22 includes the one or more computer-readable media of example 19 or some other example herein, wherein the high-performance group is for serving cell-related measurements by the UE.

Example 23 includes the one or more computer-readable media of example 19 or some other example herein, wherein the plurality of carrier groups are associated with a group of frequency layers or a group of cells.

Example 24 includes the one or more computer-readable media of example 19 or some other example herein, wherein determining the plurality of carrier groups includes determining, for each respective carrier group, a respective measurement scaling factor associated with a respective time period to complete a measurement.

Example 25 includes the one or more computer-readable media of example 24 or some other example herein, wherein the time period to complete a measurement for the normal performance group is longer than the time period to complete a measurement for the high-performance group, and wherein the time period to complete a measurement for the reduced performance group is longer than the time period to complete a measurement for the normal performance group.

Example 26 includes a method comprising: generating a radio resource control (RRC) message that includes reception beamforming information, the reception beamforming information including a number of reception beamforming patterns for performing a radio resource management (RRM) measurement; and transmitting or causing to transmit the RRC message to a next-generation nodeB (gNB).

Example 27 includes the method of example 26 or some other example herein, wherein the reception beamforming information further includes an indicator of whether reception beamforming is used by the UE, an indicator of whether reception beam switching is used by the UE, a number of reception antenna panels for reception beamforming, or a number of cycles for reception beam pattern iteration.

Example 28 includes the method of example 26 or some other example herein, wherein the method further includes: performing a radio resource management (RRM) measurement based on the reception beamforming information.

Example 29 includes the method of example 28 or some other example herein, wherein the RRM measurement is based on a reference signal, and wherein the reference signal is a synchronization signal block (SSB) or a channel state information reference signal (CSI-RS).

Example 30 includes the method of example 29 or some other example herein, wherein the RRM measurement is an intra-frequency measurement without radio frequency (RF) retuning, an intra-frequency measurement with RF retuning, or an inter-frequency measurement with RF retuning.

Example 31 includes the method of example 26 or some other example herein, wherein the RRC message further includes RF retuning information, the RF retuning information including an indicator that RF retuning is needed or an indicator that RF retuning is not needed.

Example 32 includes the method of example 26 or some other example herein, wherein the RRC message further includes measurement gap information, the measurement gap information including an indicator that a measurement gap is needed or an indicator that a measurement gap is not needed.

Example 33 includes a method comprising: receiving or causing to receive from a user equipment (UE), a radio resource control (RRC) message comprising reception beamforming information associated with a radio resource management (RRM) measurement, the reception beamforming information including a number of reception beamforming patterns for performing a radio resource management (RRM) measurement; and determining, or causing to determine, based on the reception beamforming information, measurement gap information for the UE for the RRM measurement.

Example 34 includes the method of example 33 or some other example herein, wherein the reception beamforming information further includes an indicator of whether reception beamforming is used by the UE, an indicator of whether reception beam switching is used by the UE, a number of reception antenna panels for reception beamforming, or a number of cycles for reception beam pattern iteration.

Example 35 includes the method of example 33 or some other example herein, wherein the RRC message further includes RF retuning information, the RF retuning information including an indicator that RF retuning is needed or an indicator that RF retuning is not needed.

Example 36 includes the method of example 33 or some other example herein, wherein the RRC message further includes measurement gap information, the measurement gap information including an indicator that a measurement gap is needed or an indicator that a measurement gap is not needed.

Example 37 includes a method comprising: storing reception beamforming information, the reception beamforming information including a number of reception beamforming patterns; generating a radio resource control (RRC) message including at least a portion of the reception beamforming information; and causing the RRC message to be transmitted to a next-generation NodeB (gNB) to determine measurement gap information based on the reception beamforming information.

Example 38 includes the method of example 37 or some other example herein, wherein the reception beamforming information further includes an indicator of whether reception beamforming is used, an indicator of whether reception beam switching is used, a number of reception antenna panels for reception beamforming, or a number of cycles for iterating reception beam pattern.

Example 39 includes the method of example 37 or some other example herein, further comprising: performing a radio resource management (RRM) measurement based on the reception beamforming information.

Example 40 includes the method of example 39 or some other example herein, wherein the RRM measurement is based on a reference signal, and wherein the reference signal is a synchronization signal block (SSB) or a channel state information reference signal (CSI-RS).

Example 41 includes the method of example 40 or some other example herein, wherein the RRM measurement is an intra-frequency measurement without radio frequency (RF) retuning, an intra-frequency measurement with RF retuning, or an inter-frequency measurement with RF retuning.

Example 42 includes the method of example 37 or some other example herein, wherein the RRC message further includes RF retuning information, the RF retuning information including an indicator that RF retuning is needed or an indicator that RF retuning is not needed.

Example 43 includes the method of example 37 or some other example herein, wherein the RRC message further includes measurement gap information, the measurement gap information including an indicator that a measurement gap is needed or an indicator that a measurement gap is not needed.

Example 44 includes a method comprising: identifying a set of new radio (NR) measurement resources; determining a plurality of carrier groups among which to allocate the NR measurement resources, wherein the plurality of carrier groups includes: a high-performance group containing a first portion of the NR measurement resources; a normal performance group containing a second portion of the NR measurement resources; and a reduced performance group containing a third portion of the NR measurement resources, wherein the normal performance group contains fewer measurement resources than the high-performance group, and the reduced performance group contains fewer NR measurement resources than the normal performance group; and generating a measurement configuration message for a user equipment (UE) based on the determined plurality of carrier groups.

Example 45 includes the method of example 44 or some other example herein, further comprising generating a measurement configuration message for a user equipment (UE) based on the determined plurality of carrier groups.

Example 46 includes the method of example 44 or some other example herein, wherein the method further comprises transmitting or causing to transmit the measurement configuration message to the UE.

Example 47 includes the method of example 44 or some other example herein, wherein the high-performance group is for serving cell-related measurements by the UE.

Example 48 includes the method of example 44 or some other example herein, wherein the plurality of carrier groups are associated with a group of frequency layers or a group of cells.

Example 49 includes the method of example 44 or some other example herein, wherein determining the plurality of carrier groups includes determining, for each respective carrier group, a respective measurement scaling factor associated with a respective time period to complete a measurement.

Example 50 includes the method of example 49 or some other example herein, wherein the time period to complete a measurement for the normal performance group is longer than the time period to complete a measurement for the high-performance group, and wherein the time period to complete a measurement for the reduced performance group is longer than the time period to complete a measurement for the normal performance group.

Example 51 may include an apparatus comprising means to perform one or more elements of a method described in or related to any of examples 26-50, or any other method or process described herein.

Example 52 may include one or more non-transitory computer-readable media comprising instructions to cause an electronic device, upon execution of the instructions by one or more processors of the electronic device, to perform one or more elements of a method described in or related to any of examples 26-50, or any other method or process described herein.

Example 53 may include an apparatus comprising logic, modules, and/or circuitry to perform one or more elements of a method described in or related to any of examples 26-50, or any other method or process described herein.

Example 54 may include a method, technique, or process as described in or related to any of examples 26-50, or portions or parts thereof Example 55 may include an apparatus comprising: one or more processors and one or more computer-readable media comprising instructions that, when executed by the one or more processors, cause the one or more processors to perform the method, techniques, or process as described in or related to any of examples 26-50, or portions thereof Example 56 may include a method of communicating in a wireless network as shown and described herein.

Example 57 may include a system for providing wireless communication as shown and described herein.

Example 58 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. One or more non-transitory computer-readable media storing instructions, that, when executed by one or more processors, cause a user equipment (UE) to:
    generate a radio resource control (RRC) message that includes reception beamforming information, the reception beamforming information including a number of reception beamforming patterns for performing a radio resource management (RRM) measurement; and
    transmit or cause to transmit the RRC message to a next-generation nodeB (gNB),
    wherein the RRC message further includes RF retuning information, the RF retuning information including an indicator that RF retuning is needed or an indicator that RF retuning is not needed.

2. The one or more non-transitory computer-readable media of claim 1, wherein the reception beamforming information further includes an indicator of whether reception beamforming is used by the UE, an indicator of whether reception beam switching is used by the UE, a number of reception antenna panels for reception beamforming, or a number of cycles for reception beam pattern iteration.

3. The one or more non-transitory computer-readable media of claim 1, wherein the one or more computer-readable media further stores instructions for causing the UE to: perform a radio resource management (RRM) measurement based on the reception beamforming information.

4. The one or more non-transitory computer-readable media of claim 3, wherein the RRM measurement is based on a reference signal, and wherein the reference signal is a synchronization signal block (SSB) or a channel state information reference signal (CSI-RS).

5. The one or more non-transitory computer-readable media of claim 4, wherein the RRM measurement is an intra-frequency measurement without radio frequency (RF) retuning, an intra-frequency measurement with RF retuning, or an inter-frequency measurement with RF retuning.

6. The one or more non-transitory computer-readable media of claim 1, wherein the RRC message further includes measurement gap information, the measurement gap information including an indicator that a measurement gap is needed or an indicator that a measurement gap is not needed.

7. One or more non-transitory computer-readable media storing instructions, that, when executed by one or more processors, cause a next-generation nodeB (gNB) to:
    receive or cause to receive from a user equipment (UE), a radio resource control (RRC) message comprising reception beamforming information associated with a radio resource management (RRM) measurement, the reception beamforming information including a number of reception beamforming patterns for performing a radio resource management (RRM) measurement; and
    determine, or cause to determine, based on the reception beamforming information, measurement gap information for the UE for the RRM measurement,
    wherein the RRC message further includes RF retuning information, the RF retuning information including an indicator that RF retuning is needed or an indicator that RF retuning is not needed.

8. The one or more non-transitory computer-readable media of claim 7, wherein the reception beamforming information further includes an indicator of whether reception beamforming is used by the UE, an indicator of whether reception beam switching is used by the UE, a number of reception antenna panels for reception beamforming, or a number of cycles for reception beam pattern iteration.

9. The one or more non-transitory computer-readable media of claim 7, wherein the RRC message further includes measurement gap information, the measurement gap information including an indicator that a measurement gap is needed or an indicator that a measurement gap is not needed.

10. An apparatus comprising:
    memory to store reception beamforming information, the reception beamforming information including a number of reception beamforming patterns; and
    processing circuitry, coupled with the memory, to:
        generate a radio resource control (RRC) message including at least a portion of the reception beamforming information; and
        cause the RRC message to be transmitted to a next-generation NodeB (gNB) to determine measurement gap information based on the reception beamforming information,
    wherein the RRC message further includes RF retuning information, the RF retuning information including an indicator that RF retuning is needed or an indicator that RF retuning is not needed.

11. The apparatus of claim 10, wherein the reception beamforming information further includes an indicator of whether reception beamforming is used, an indicator of whether reception beam switching is used, a number of reception antenna panels for reception beamforming, or a number of cycles for reception beam pattern iteration.

12. The apparatus of claim 10, wherein the processing circuitry is further to: perform a radio resource management (RRM) measurement based on the reception beamforming information.

13. The apparatus of claim 12, wherein the RRM measurement is based on a reference signal, and wherein the reference signal is a synchronization signal block (SSB) or a channel state information reference signal (CSI-RS).

14. The apparatus of claim 13, wherein the RRM measurement is an intra-frequency measurement without radio frequency (RF) retuning, an intra-frequency measurement with RF retuning, or an inter-frequency measurement with RF retuning.

15. The apparatus of claim 10, wherein the RRC message further includes measurement gap information, the measurement gap information including an indicator that a measurement gap is needed or an indicator that a measurement gap is not needed.

16. A method of operating a user equipment (UE) to:
generating a radio resource control (RRC) message that includes reception beamforming information, the reception beamforming information including a number of reception beamforming patterns for performing a radio resource management (RRM) measurement; and
transmitting the RRC message to a next-generation nodeB (gNB),
wherein the RRC message further includes RF retuning information, the RF retuning information including an indicator that RF retuning is needed or that RF retuning is not needed.

17. The method of claim 16, wherein the reception beamforming information further includes an indicator of whether reception beamforming is used by the UE, an indicator of whether reception beam switching is used by the UE, a number of reception antenna panels for reception beamforming, or a number of cycles for reception beam pattern iteration.

18. The method of claim 16, further comprising performing a radio resource management (RRM) measurement based on the reception beamforming information.

19. The method of claim 18, wherein the RRM measurement is based on a reference signal, and wherein the reference signal is a synchronization signal block (SSB) or a channel state information reference signal (CSI-RS).

20. The method of claim 19, wherein the RRM measurement is an intra-frequency measurement without radio frequency (RF) retuning, an intra-frequency measurement with RF retuning, or an inter-frequency measurement with RF retuning.

* * * * *